United States Patent

Ahn

[11] Patent Number: 6,161,609

[45] Date of Patent: Dec. 19, 2000

[54] FLOW CONTROL APPARATUS

[75] Inventor: Young-Kil Ahn, Kwangju, Rep. of Korea

[73] Assignee: Carrier Corporation, Farmington, Conn.

[21] Appl. No.: 09/200,295

[22] Filed: Nov. 25, 1998

[51] Int. Cl.[7] .................................................. F28F 19/00
[52] U.S. Cl. ......................... 165/41; 165/122; 165/125; 62/DIG. 16; 454/136
[58] Field of Search .............................. 165/41, 125, 122, 165/903; 62/428, DIG. 16; 454/136, 137, 140

[56] References Cited

U.S. PATENT DOCUMENTS

| 2,768,814 | 10/1956 | Frey et al. ........................ 165/903 X |
| 3,756,039 | 9/1973 | Riello . |
| 4,592,207 | 6/1986 | Rummel ....................... 62/DIG. 16 X |
| 4,607,499 | 8/1986 | Bolton et al. . |
| 4,641,502 | 2/1987 | Aldrich et al. . |
| 4,672,818 | 6/1987 | Roth . |
| 4,712,611 | 12/1987 | Witzel ................................ 165/903 X |
| 5,222,374 | 6/1993 | Thompson et al. . |
| 5,461,880 | 10/1995 | Bolton et al. . |
| 5,605,055 | 2/1997 | Salgado ....................... 62/DIG. 16 X |
| 5,632,330 | 5/1997 | Drucker et al. .................. 165/125 X |
| 5,638,693 | 6/1997 | Baek . |
| 5,918,666 | 7/1999 | Chin ..................................... 165/122 |
| 6,041,853 | 3/2000 | Edayoshi et al. .................... 165/122 |

FOREIGN PATENT DOCUMENTS

| 3318708 | 11/1984 | Germany ...................... 62/DIG. 16 |
| 0089247 | 8/1978 | Japan ................................... 165/122 |
| 0069335 | 4/1983 | Japan ................................... 165/122 |
| 0195219 | 8/1986 | Japan ................................... 165/125 |
| 0257317 | 11/1986 | Japan ...................... 62/DIG. 16 |
| 0036432 | 2/1991 | Japan ................................... 165/903 |

*Primary Examiner*—Christopher Atkinson
*Attorney, Agent, or Firm*—Wall Marjama & Bilinski

[57] ABSTRACT

Apparatus for controlling the return air flow to the evaporator coil of an air conditioning unit that is mounted on the roof of a vehicle wherein the return air flow enters the unit vertically and must be turned 90° in a limited amount of space before being delivered to the coil. A plenum is mounted over the return air duct that has a back wall containing an arcuate segment that curves inwardly over the entrance toward the entrance face of the coil. A stabilizer is mounted along the inner edge of the entrance in front of the coil which coacts with the contoured rear wall of the plenum to evenly distribute the return flow across the coil and prevent unwanted turbulence in the flow that would inhibit flow through the coil.

8 Claims, 6 Drawing Sheets

BEFORE

AFTER THE STABILIZER SETTING 6,161,609

FLOW CONTROL APPARATUS

BACKGROUND OF THE INVENTION

This invention relates to flow control apparatus for use in a vehicle roof top air conditioning unit for uniformly distributing the return air flow across the entrance face of an evaporator coil.

Air conditioning units that are mounted on the roofs of motor vehicles such as trailers, vans, motor homes, or the like generally passes conditioned supply air downward through a vertical opening in the vehicle's cabin roof. By the same token, return air is also able to be drawn vertically into the unit through a second opening in the cabin roof. Accordingly, the return air flow must be turned about 90° before entering the evaporator heat exchanger and the conditioned air again turned 90° upon leaving the heat exchanger before being discharged through the supply air duct. The routing of conditioned supply air is normally achieved by use of a centrifugal blower which is positioned adjacent to the exit face of the heat exchanger over the supply air duct. The blower is arranged to draw return air through the heat exchanger and pump the conditioned air downwardly through the supply air duct.

The blower arrangement is a relatively efficient means of handling the supply air. Routing return air through the evaporator heat exchanger is more difficult and typically less efficient. Turning the vertical incoming flow toward the entrance face of the heat exchanger within the limited space available oftentimes results in a non-uniform flow distributor across the evaporator, thereby adversely effecting its performance and that of the unit. In addition, vortices and turbulence can also be created in the flow which serve to block the return air flow to parts of the exchanger.

SUMMARY OF THE INVENTION

It is an object of the present invention to improve air conditioning systems that are mounted upon the roofs of vehicles such as motor homes and the like.

It is a further object of the present invention to more efficiently handle the return air from the cabin of a vehicle through the evaporator section of a roof-mounted air conditioning unit.

A still further object of the present invention is to efficiently turn a vertical stream of return air to an air condition unit so that the stream is uniformly distributed across the vertically disposed entrance face of a heat exchanger.

Another object of the present invention is to turn an incoming vertical stream of return air to an air condition unit efficiently within a relatively limited amount of space to provide a uniform distributed flow of air across the entrance face of a vertically disposed heat exchanger.

Yet another object of the present invention is to prevent turbulence in the return air flow of a vehicle roof mounted air conditioning unit.

These and other objects of the present invention are attained by means of control apparatus for use in an air conditioning unit that is mounted on the roof of a vehicle cabin wherein return air to the unit is drawn vertically into the unit and turned 90° within a limited amount of space before entering the evaporator coil. An air plenum has an entrance that is positioned directly over the return air duct of the unit. The entrance is generally rectangular in form and has an inner edge parallel with and spaced apart from the entrance face of the coil. The coil forms the back wall of the plenum and its front wall includes a vertical lower segment that is mounted adjacent to the outer edge of the entrance and an arcuate shaped upper segment that curves inwardly toward the evaporator coil so that the upper segment completely overlies the entrance region of the plenum. A vertically disposed stabilizer panel is mounted along the inner edge of the entrance that is parallel with the lower segment of the back wall. The stabilizer has a vertical height that is less than that of the lower segment of the back wall. The height of the stabilizer is related to the geometry of the upper section of the back wall to prevent turbulence from being developed in the return air flow and to produce a uniform flow distribution over the entrance face of the evaporator coil.

BRIEF DESCRIPTION OF THE DRAWING

For a better understanding of these and other objects of the present invention, reference will be made to the following detailed description of the invention, which is to be read in association with the accompanying drawings, wherein.

DETAILED DESCRIPTION OF THE INVENTION

Figure 1:
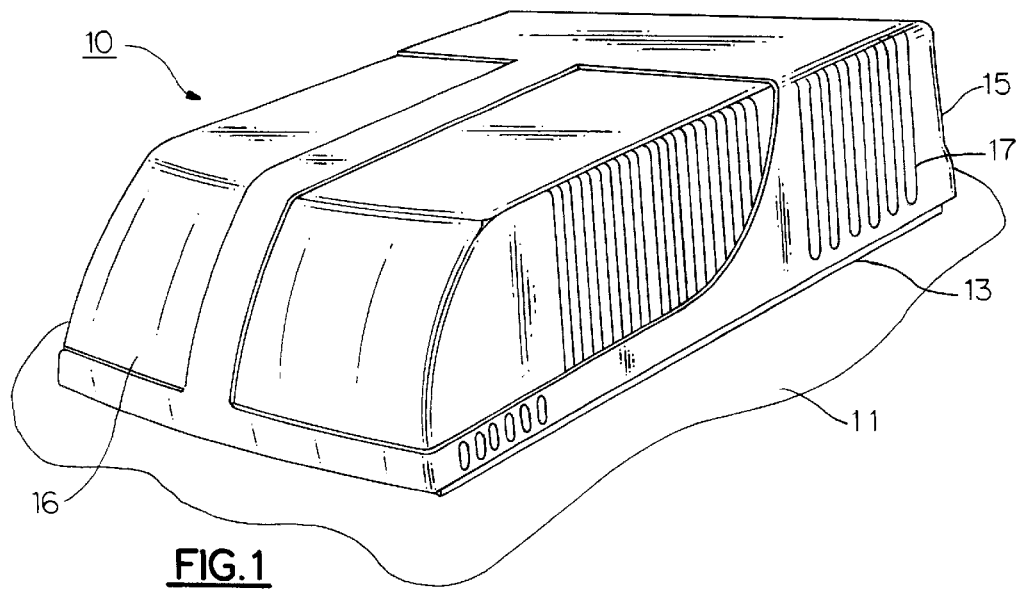
FIG. 1 is a perspective view illustrating a vehicle roof top air conditioning unit embodying the teachings of the present invention.
Figure 2:
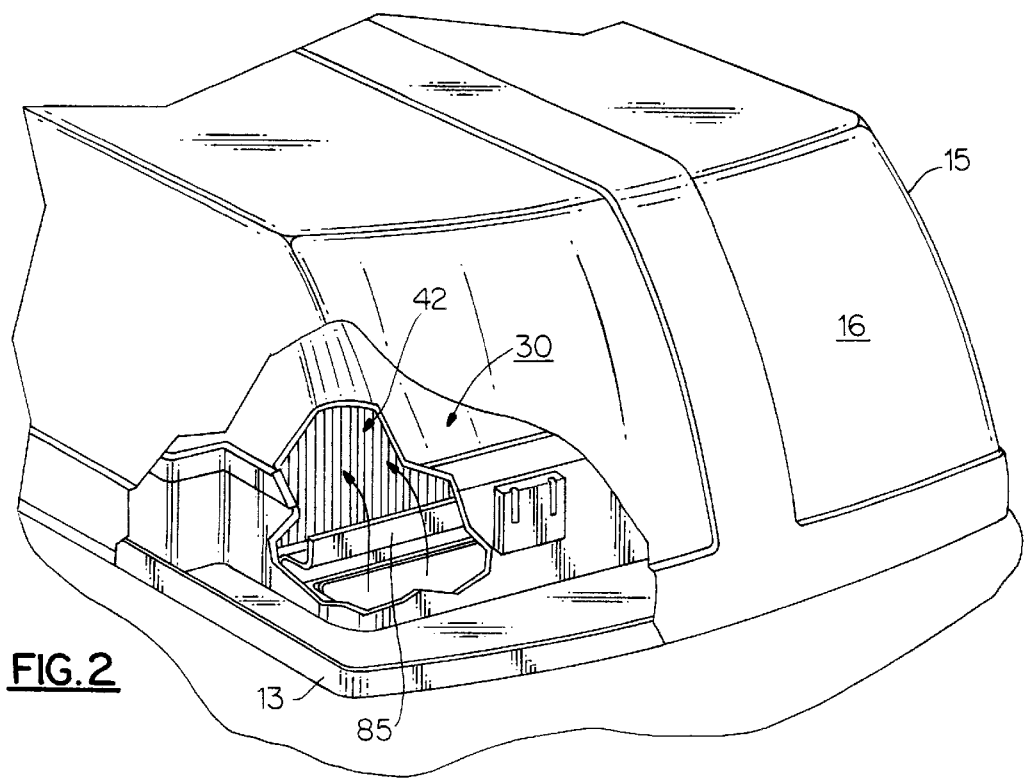
FIG. 2 is an enlarged partial perspective view of the unit illustrated in FIG. 1 showing a portion of the front of the unit broken away.

Turning initially to FIG. 1 there is illustrated a roof top air conditioning unit, generally referenced 10, that embodies the teachings of the present invention. The unit is mounted upon the cabin roof 11 of a vehicle such as a trailer, a van or a motorized home (sometimes referred to as a recreational vehicle or simply an RV). The unit includes a base pan 13 that is secured to the cabin roof by any suitable means such as threaded fasteners or the like and a shroud 15 that is removably connected to the base pan. The shroud has a streamlined front face 16 designed to reduce friction as it passes through the air as the vehicle to which the unit is attached moves in a forward direction. The shroud further includes a series of slotted openings 17 that are strategically positioned to permit ambient air to move into and out of the unit. The shroud and the pan are molded of high impact resistant plastic to provide a high strength, light weight assembly.

As noted above, with regard to the Roth patent, many vehicle roof top air conditioning units have been compartmentalized wherein the condenser section is located in a first compartment, the evaporator section is placed in a second compartment, and the motor drive, compressor, and controls located in a third compartment between the other two. The compartments are generally separated by molded walls that are arranged to isolate one section of the unit from the other. As will be explained below in further detail, the present invention moves away from the multiple compartment concept and greatly simplifies the internal construction of a vehicle roof top air conditioning unit to provide for ease of access while reducing the weight of the unit without sacrificing performance. The present unit contains a molded two-piece housing that encloses the evaporator section of the unit to isolate the evaporator component both physically and thermally from the remainder of the system. The remaining components are mounted on the base pan in a generally open arrangement so that ambient air can flow freely thereabout to provide cooling to the uncompartmentalized components as well as ready access to the components mounted therein. The entire assembly is enclosed by the shroud and is affixed to the base pan.

With further reference to FIGS. 3–9, there is illustrated the present air conditioning unit with the shroud removed. The unit includes an L-shaped condenser coil 19 that faces the rear of the unit and which is secured to the base pan by any suitable means. A motor 20, having a pair of horizontally disposed shafts 21 and 22, is also secured to the base pan along with a compressor 25 forward of the condenser section. A condenser fan 26 (FIG. 3) is attached to shaft 21 while an evaporator blower 27 is similarly affixed to shaft 22.

The evaporator blower 27 is contained within an evaporator housing generally referenced 30. The housing is split horizontally into two sections and includes a lower section 31 that is secured to the base pan by any suitable means and an upper section 33 that is removably connected to the lower section 34 by spring biased latches 35 (FIG. 9) that are mounted in pairs along the top edge periphery of the lower section of the housing. Each latch contains a hook-like appendage 36 that is carried upon the distal end of elongated resilient arms 37. The hooks are arranged at closure to snap over horizontally disposed lugs 38 (FIG. 6) located on the upper housing section along the lower edge thereof.

Figure 3:
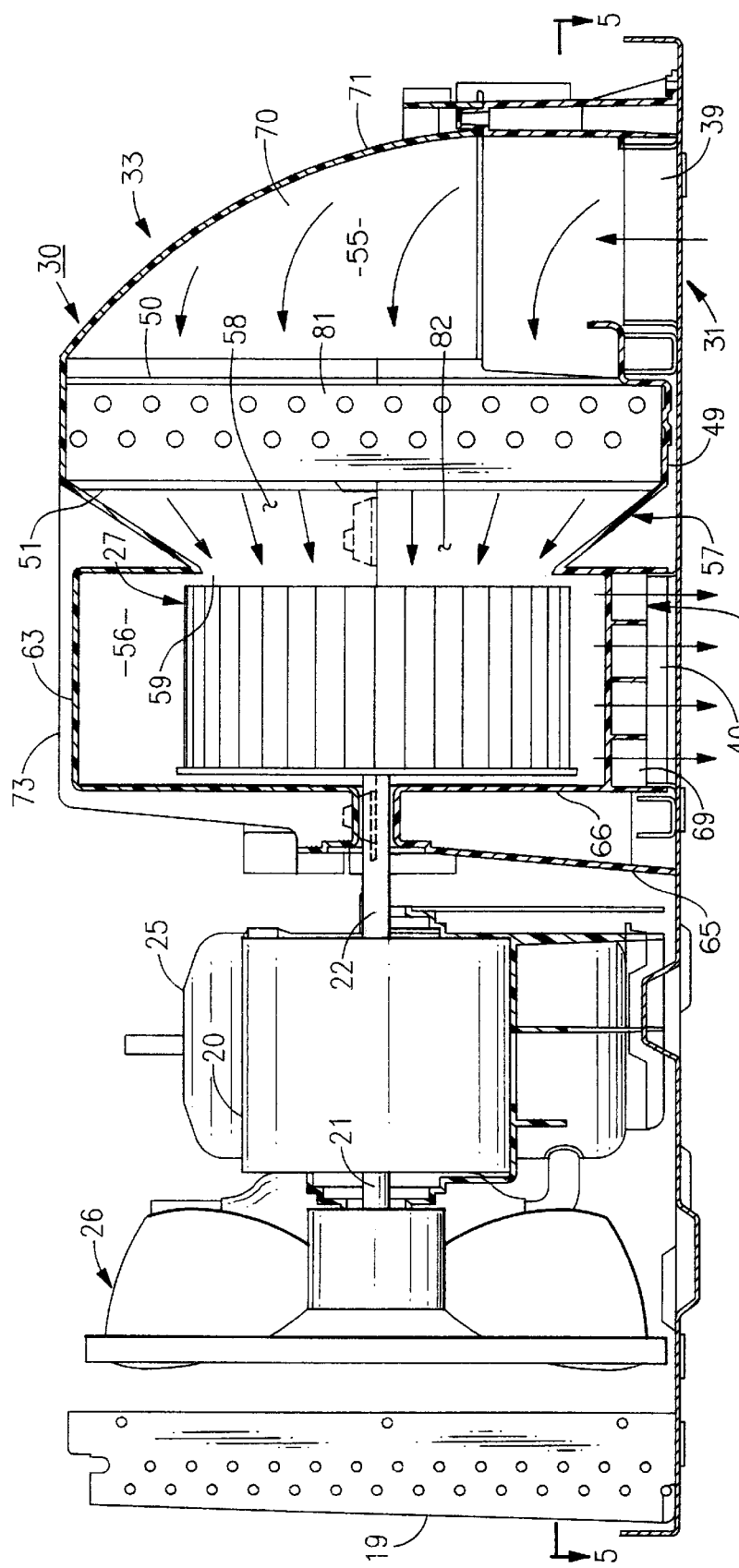
FIG. 3 is an enlarged side elevation in section of the unit illustrated in FIG. 1 with the shroud and other parts removed to more clearly show the construction of an evaporator housing that isolates the evaporator section of the unit from other parts of the unit.
Figure 4:
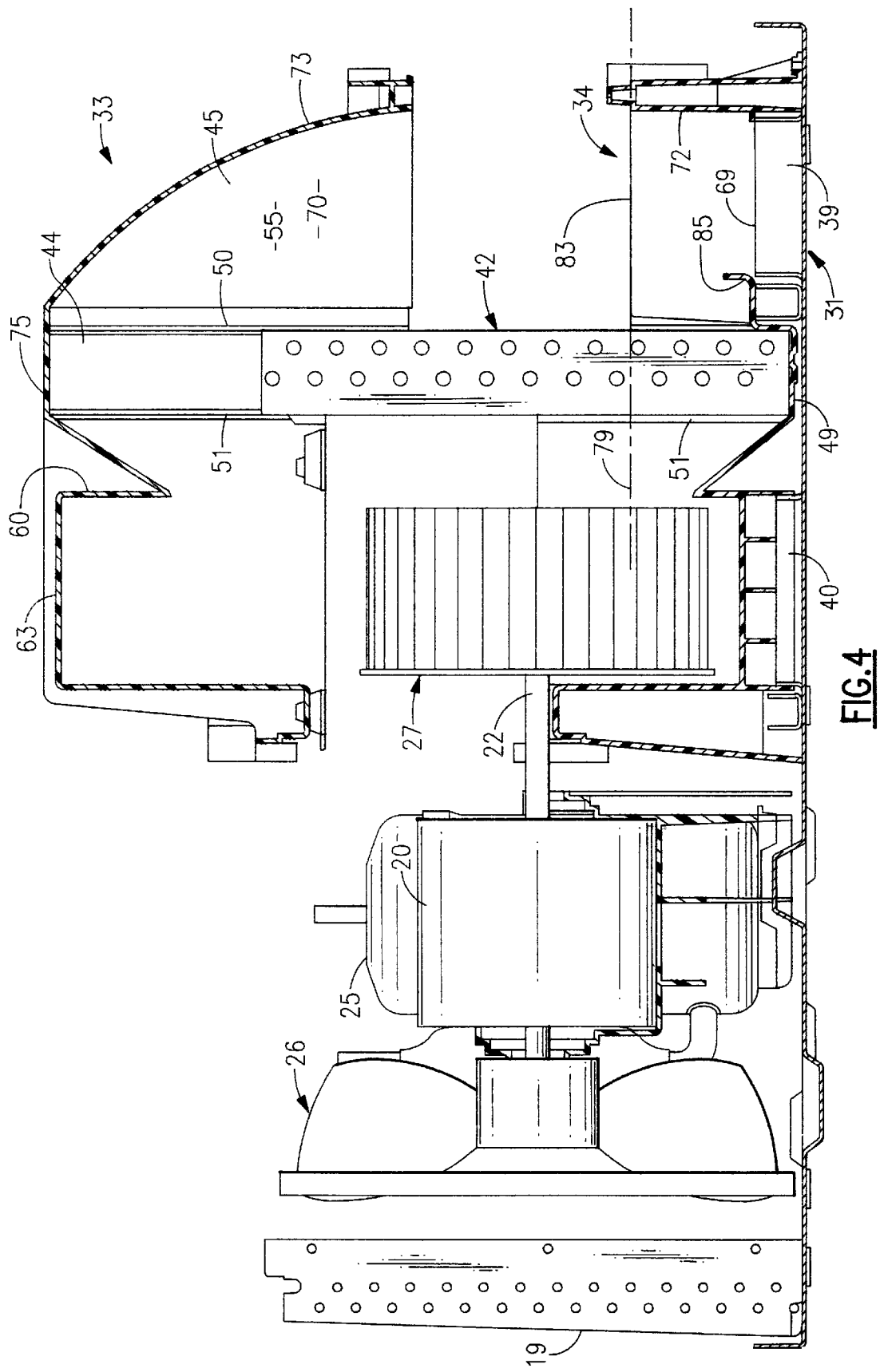
FIG. 4 is similar to FIG. 3 further showing the upper section of the evaporator housing removed from the lower section.
Figure 5:
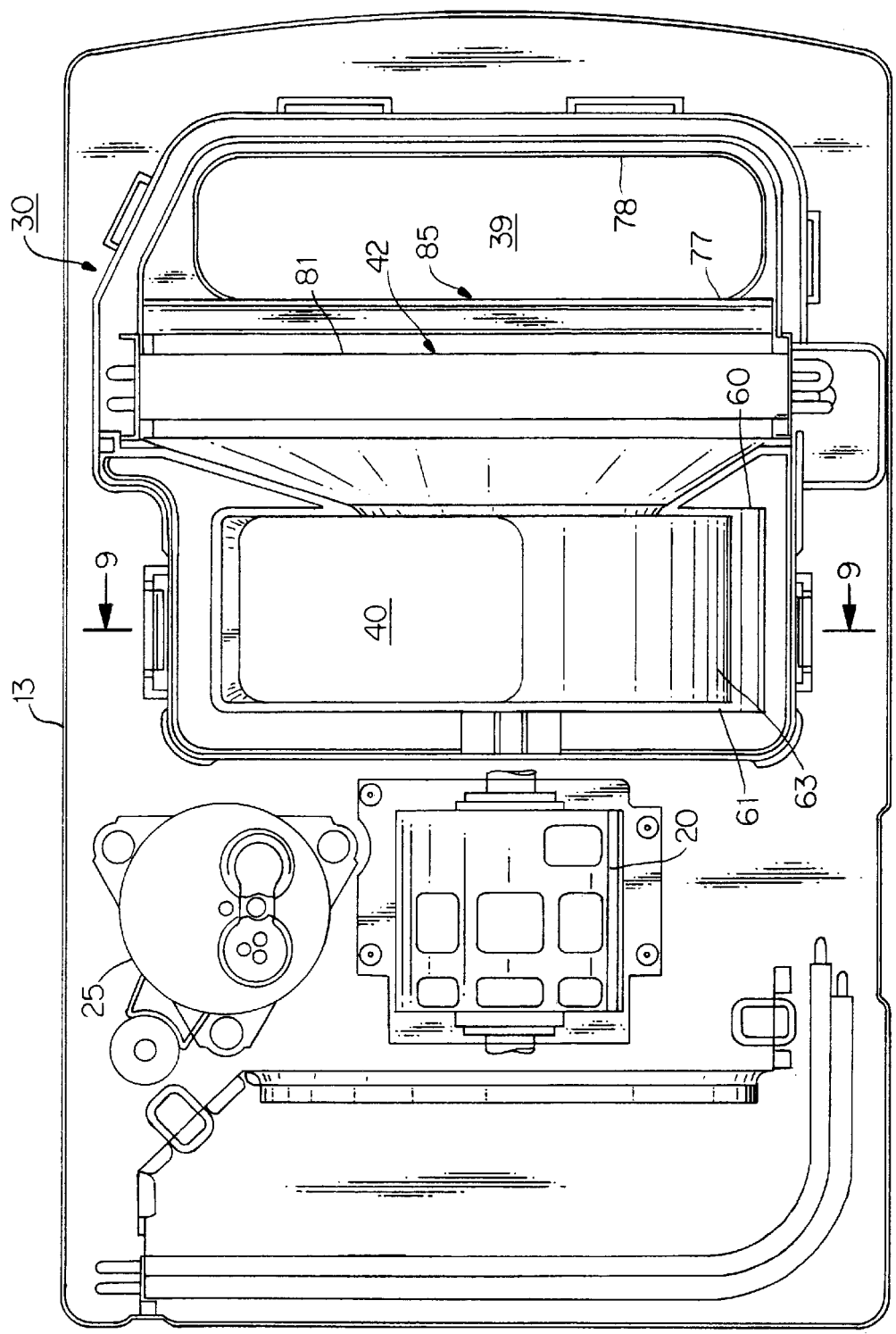
FIG. 5 is a section taken along lines 5—5 in FIG. 3 with the evaporator blower and the condenser fan removed to more clearly show the interior of the unit.
Figure 7:
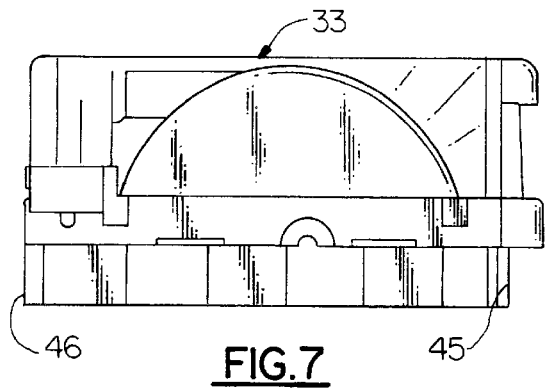
FIG. 7 is an end view of the upper section illustrated in FIG. 6.
Figure 6:
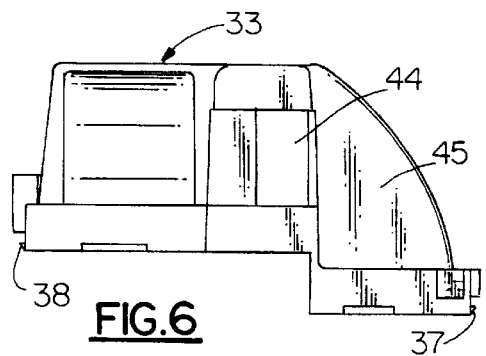
FIG. 6 is a side elevation showing the upper section of the evaporator housing.
Figure 8:
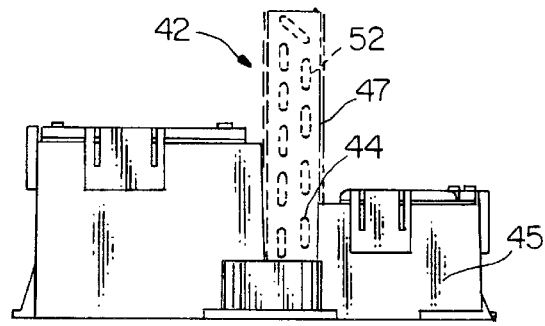
FIG. 8 is a side elevation of the lower section of the evaporator section.
Figure 9:
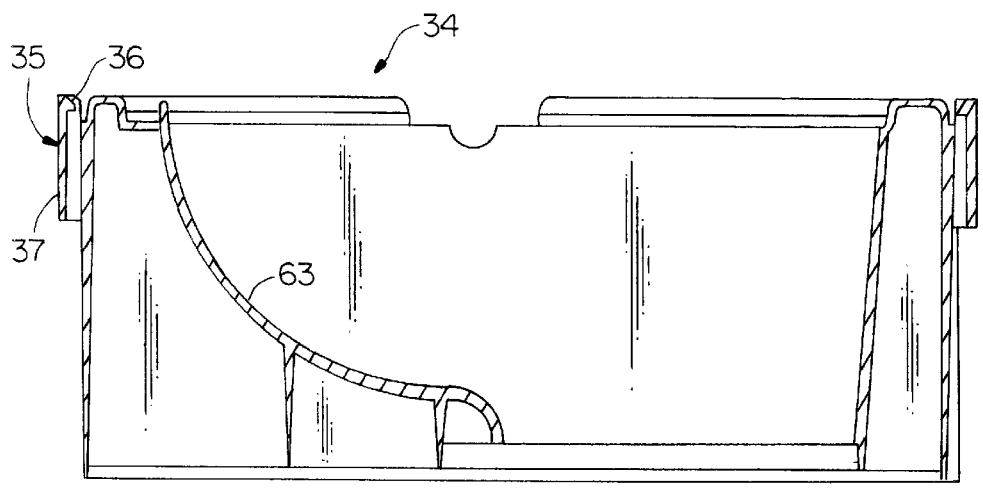
FIG. 9 is an enlarged side elevation in section of the lower section of the evaporator housing.

Both the upper section and the lower section of the evaporator housing are molded from high strength, high impact resistant plastic. As best illustrated in FIGS. 3–5, the lower section of the housing is positioned over both the return air duct 39 and the supply air duct 40 of the system, both of which communicate with the vehicle cabin. Air enters and leaves the housing vertically and accordingly, the air stream must be turned 180° within a very limited amount of space. A heat exchanger in the form of an evaporator coil 42 is mounted inside the housing adjacent to and to the rear of the return air duct. The two sections at closure cooperate to establish elongated vertically disposed openings 44 in the opposed side walls 45 and 46 of the housing adjacent to the tube sheets 47 of the evaporator coil. A pair of opposed guideways 50 and 51 are integrally molded along the inside of the side walls of the housing adjacent the vertical edges of each opening. The guideways are adapted at closure to contact the opposed tube sheets of the coil and provide a relatively leak tight joint therebetween. In assembly, the coil rests upon a seat 49 that is located on the floor of the housing and the tube bends 52 associated with the evaporator coil extend outwardly through the elongated openings thus providing for easy installation of the coil and unobstructed installation and removal of the upper section of the housing.

The housing 30 contains two chambers which are the evaporator coil chamber 55 located at the front of the housing and the blower chamber 56 located at the front of the housing. A converging nozzle 57 is molded integrally into the walls of the housing through which the evaporator chamber communicates with the blower chamber. The nozzle has a rectangular shaped entrance 58 that frames the exit face 82 of evaporator coil and a circular exit 59 that encircles the air intake to the blower 27. The nozzle opens into the blower chamber through the vertical front wall of the blower chamber which again is integrally molded as part of the housing.

The blower, in assembly, is mounted directly over the supply air duct and is encircled by a scroll 63 which empties into the supply air duct. The rear wall 60 of the evaporator chamber and the back wall 61 of the housing are cojoined with the scroll to enclose the blower chamber to provide a diverging flow passage for the conditioned supply air discharged by the blower thereby increasing the velocity of the supply air entering the cabin of the vehicle.

A stanchion 65 is molded into the back wall 66 of the housing adjacent to the blower section 34 thereof. The stanchion provides additional strength to the housing and cooperates with the upper section of the housing at closure to provide an opening 67 through which the motor shaft 22 passes into the blower chamber. As noted above, the shaft is affixed to the blower wheel and turns the wheel at a desired speed to pump conditioned air delivered by the nozzle through the supply air duct. A distributor 68 is mounted between the walls 60 and 61 of the blower over the supply duct chamber that contains a series of passages 69 for uniform distributing the discharged conditioned air across the supply air duct.

Return air from the vehicle is recirculated back to the unit through return air duct 39 that forms the entrance (FIG. 4) to an air plenum 70 that is located at the front of the evaporator housing. The front wall 71 of the housing also serves as the front wall of the plenum while the entrance face 81 of the evaporator coil serves as the back wall of the plenum. The front wall includes two segments that are a lower vertical segment 72 and an upper arcuate shaped segment 73 (FIG. 4). The upper wall segment is fully contained in the upper section 33 of the evaporator housing and is integrally joined to the top wall 75 of the housing. The lower wall segment is similarly fully contained within the lower section 31 of the housing. The vertical height of the upper wall segment 73 of the plenum is about between 2 and 2½ times that of the lower wall segment 72.

The entrance to the plenum is generally rectangular shaped as illustrated in FIG. 5 and contains an inner edge 77 that is parallel with and spaced apart from the entrance face 81 of the evaporator coil. The outer edge 78 of the plenum entrance is spaced apart from the inner edge 77 and runs generally parallel with and along the lower wall segment of the front wall. The arcuate upper segment of the front wall generally describes the arc of a circle and curves back toward the evaporator coil so that it completely overlies the return air entrance. The center of curvature of the upper wall segment lies in a horizontal plane 79 that defines the top edge 83 of the lower wall segment (FIG. 4).

A stabilizer 85 is mounted along the inner edge of the plenum entrance. The stabilizer is a vertical panel that is molded as an integral part of the housing. The stabilizer has a height that is less than the height of the lower segment of the front wall so that it is fully contained within the lower section of the housing. The stabilizer is spaced apart from the entrance face of the evaporator coil to permit return air to pass behind the panel and is set back from the entrance face of the coil a distance that is about equal to the height of the panel. The height of the stabilizer is also matched to the radius of curvature of the upper front wall segment to control the flow of return air through the plenum. The two are designed to act in concert to turn the incoming return air flow 90° and direct the flow uniformly across the entrance face of the evaporator coil. In addition, the stabilizer acts like a wing spoiler on an aircraft to prevent turbulence from developing along the entrance surface of the evaporator coil. Any turbulence that might develop in this region takes the form of vortices that act to inhibit air flow into the coil and thus reducing the performance of the coil.

Figure 10:
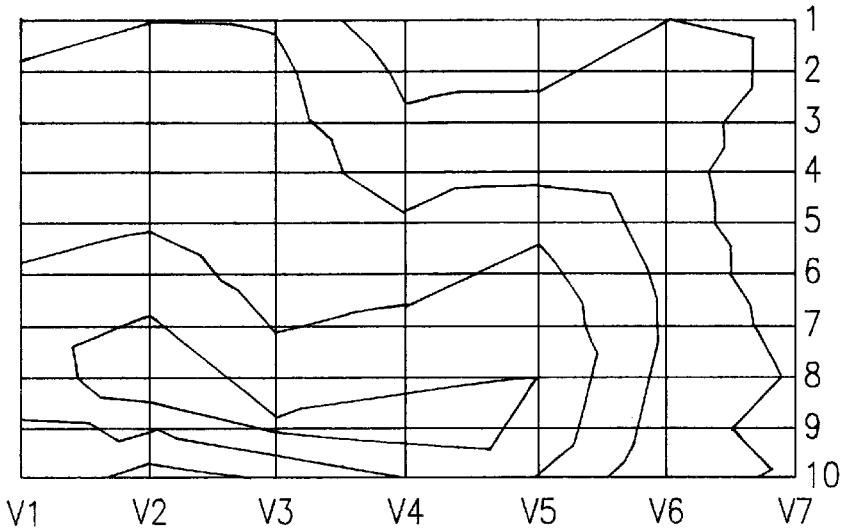
FIG. 10 is a graphic representation illustrating the air distribution in a flow moving through a plenum as herein described that is not equipped with a stabilizer.
Figure 11:
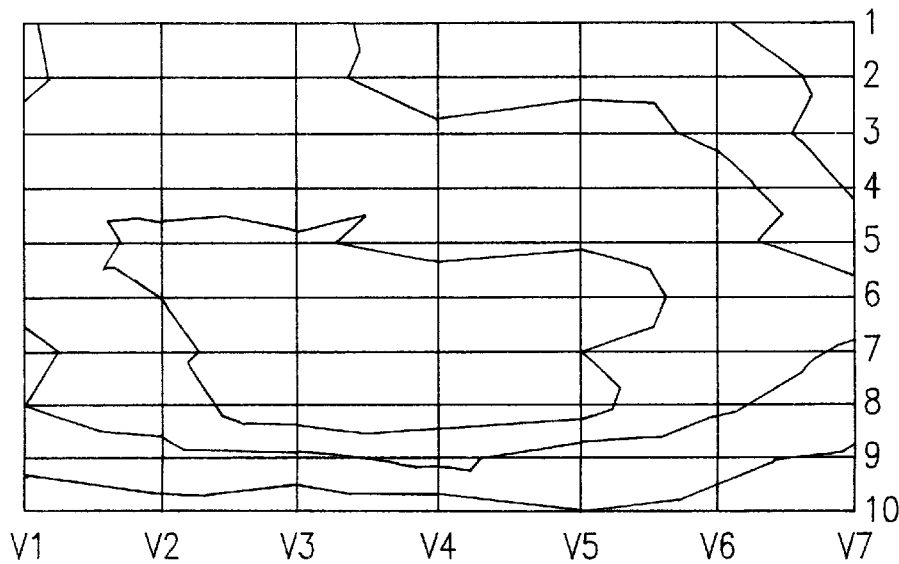
FIG. 11 is a graphic representation similar to that depicted in FIG. 10 that is equipped with a flow stabilizer.

Turning now to FIGS. 10 and 11, there are shown two graphic illustrations depicting the distribution of flow through a plenum of the type herein described. The graph illustrated is a plot of flow pattern at the coil entrance face in a plenum that is not equipped with a flow stabilizer. The flow distribution across the coil entrance, as depicted in the graph is set out in Table 1 below:

TABLE 1

| | | | Air Distribution | | | | Unit: m/s |
|---|---|---|---|---|---|---|---|
| | V1 | V2 | V3 | V4 | V5 | V6 | V7 |
| 1 | 4.5 | 5 | 4.9 | 3.1 | 3.1 | 4 | 3.8 |
| 2 | 5.2 | 5.6 | 5.2 | 3.8 | 3.8 | 4.4 | 3.8 |
| 3 | 5.2 | 5.2 | 5.3 | 4.1 | 4.3 | 4.4 | 3.5 |
| 4 | 5.1 | 5.7 | 5.4 | 4.6 | 4.8 | 4.4 | 3.2 |
| 5 | 5.6 | 5.9 | 5.2 | 5.1 | 5.8 | 4.5 | 3.2 |
| 6 | 6.1 | 6.5 | 5.5 | 5.6 | 6.3 | 4.8 | 3.2 |
| 7 | 6.5 | 7.1 | 5.9 | 6.2 | 6.7 | 4.9 | 3.6 |
| 8 | 6.4 | 7.7 | 6.5 | 6.8 | 7 | 4.7 | 3.9 |
| 9 | 5.8 | 6.1 | 7.1 | 7.5 | 6.9 | 4.5 | 3.5 |
| 10 | 5.7 | 4.5 | 5 | 6 | 5.9 | 4.2 | 3.9 |

A stabilizer as described above was mounted in the entrance region of the plenum. The stabilizer had a vertical height that was equal to the distance it was spaced from the evaporator coil. Again, the flow distribution pattern across the face of the coil was plotted as shown in FIG. 11 and the results are shown in Table 2.

TABLE 2

| | | | Air Distribution | | | | Unit: m/s |
|---|---|---|---|---|---|---|---|
| | V1 | V2 | V3 | V4 | V5 | V6 | V7 |
| 1 | 4.9 | 5.6 | 5.6 | 4.1 | 4.4 | 4.1 | 3.3 |
| 2 | 4.8 | 5.8 | 5.4 | 4.3 | 4.7 | 4.6 | 3.7 |
| 3 | 5.3 | 5.5 | 5.7 | 5.2 | 5.5 | 4.8 | 3.4 |
| 4 | 5.4 | 5.3 | 5.6 | 5.9 | 5.7 | 5.5 | 3.9 |
| 5 | 5 | 6A | 6.1 | 5.7 | 5.9 | 5.2 | 4.5 |
| 6 | 5.4 | 6 | 6.6 | 6.5 | 6.9 | 5.5 | 5.4 |
| 7 | 4.7 | 5.8 | 6.5 | 6.2 | 6 | 5.3 | 4.9 |
| 8 | 5 | 5.5 | 6.8 | 6.4 | 6.3 | 5.2 | 4.3 |
| 9 | 4.4 | 4.6 | 4.7 | 5.3 | 4.3 | 4.1 | 3.9 |
| 10 | 3 | 3.7 | 3.3 | 3.2 | 4 | 3.9 | 3.5 |

As can be seen from the tables, the plenum equipped with a stabilizer had a more even distribution of flow at the evaporator coil face when compared with one not similarly equipped. In addition, the stabilizer reduced areas of high velocity thus reducing the possibility of turbulence being developed in the flow. The reduction in zones of relatively high velocity flow also effectively reduces the amount of objectional noise produced by the unit.

While the present invention has been particularly shown and described with reference to the preferred mode as illustrated in the drawing, it will be understood by one skilled in the art that various changes in detail may be effected therein without departing from the spirit and scope of the invention as defined by the claims.

I claim:

1. Flow control apparatus for use in a roof top air conditioner unit said rooftop air conditioner unit having a vertically disposed return air duct and a vertically disposed supply air duct, a heat exchanger coil mounted between said ducts and a blower mounted adjacent an exit face of said coil over the supply air duct for drawing conditioned air through said coil, said flow control apparatus including an air plenum mounted over the return air duct that has a return air entrance having an inner edge that is parallel with the heat exchanger coil's entrance face and spaced apart therefrom a given distance and an outer edge that is parallel with and spaced apart from said inner edge, said plenum further including a front wall having an arcuate shape that curves inwardly toward the entrance face of the heat exchanger coil so that an upper segment overlies the return air entrance, and a substantial vertically disposed stabilizer that is mounted along the inner edge of said return air entrance that is substantial with a lower segment of the plenum front wall, said stabilizer having a vertical height that is less than the vertical height of said lower segment of a back wall.

2. The flow control apparatus of claim 1 wherein said upper segment of the back wall describes an arc of a circle.

3. The flow control apparatus of claim 2 wherein said entrance face of said heat exchanger coil forms the back wall of the plenum.

4. The flow control apparatus of claim 3 wherein said back wall of the plenum has a vertically disposed lower segment and a curved upper segment.

5. The flow control apparatus of claim 1 wherein the upper segment of the front wall describes an arc of a circle whose center of curvature lies in a horizontal plane that defines the top surface of the lower segment.

6. The flow control apparatus of claim 5 wherein the vertical height of the upper segment of the plenum has a vertical height that is between two and two and one-half that of the lower segment.

7. The flow control apparatus of claim 1 wherein the vertical height of the stabilizer is about equal to its given distance from the entrance face of the heat exchanger coil.

8. The flow control apparatus of claim 1 wherein the radius of curvature of the front wall is related to the height of said stabilizer to prevent turbulence from being developed in return air flow moving through the plenum.

* * * * *